United States Patent
Kumar et al.

(10) Patent No.: US 9,501,661 B2
(45) Date of Patent: Nov. 22, 2016

(54) SYSTEMS AND METHODS FOR IMPLEMENTING AN ENCRYPTED SEARCH INDEX

(71) Applicant: salesforce.com, inc., San Francisco, CA (US)

(72) Inventors: Mukul Raj Kumar, Oakland, CA (US); Prasad Peddada, Alameda, CA (US)

(73) Assignee: salesforce.com, inc., San Francisco, CA (US)

( * ) Notice: Subject to any disclaimer, the term of this patent is extended or adjusted under 35 U.S.C. 154(b) by 30 days.

(21) Appl. No.: 14/320,135

(22) Filed: Jun. 30, 2014

(65) Prior Publication Data

US 2015/0356314 A1 Dec. 10, 2015

Related U.S. Application Data

(60) Provisional application No. 62/010,413, filed on Jun. 10, 2014.

(51) Int. Cl.
*H04L 29/06* (2006.01)
*G06F 17/30* (2006.01)
*G06F 17/00* (2006.01)
*G06F 7/00* (2006.01)
*G06F 21/62* (2013.01)

(52) U.S. Cl.
CPC ..... *G06F 21/6254* (2013.01); *G06F 17/30336* (2013.01); *G06F 17/30011* (2013.01); *G06F 17/3071* (2013.01); *G06F 17/30864* (2013.01); *G06F 21/6209* (2013.01); *G06F 21/6218* (2013.01); *G06F 21/6227* (2013.01); *G06F 21/6245* (2013.01); *G06F 2221/2107* (2013.01); *H04L 63/08* (2013.01)

(58) Field of Classification Search
CPC ............... G06F 21/6218; G06F 2221/2107; G06F 21/6209; G06F 17/30011; G06F 21/6227; G06F 21/6245; G06F 17/30864; G06F 17/3071; H04L 63/08
USPC ...... 713/165; 726/2; 707/694, 706, 711, 737
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

*Primary Examiner* — Aravind Moorthy
(74) *Attorney, Agent, or Firm* — Blakely Sokoloff Taylor & Zafman LLP

(57) ABSTRACT

A search index stored within the system having a plurality of individual search index files having information stored therein. At least one of the individual search index files constitutes a term dictionary or a term index type file having internal structure that allows a portion of the individual search index file to be updated, encrypted, and/or decrypted without affecting the internal structure of the individual search index file. A file input/output (IO) layer encrypts the information being written into the individual search index file and to decrypt the information being read from the individual search index file. The file TO layer encrypts and decrypts only a portion of the individual search index file in reply to an operation without requiring decryption or encryption of the individual search index file in its entirety. A query interface executes the operation against the information stored in the memory in its decrypted form.

24 Claims, 10 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,131,691 B1* | 3/2012 | Nagaralu ............ G06F 17/30091 |
| | | 707/696 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0143084 A1* | 6/2006 | Donnelli ................ G06Q 30/02 |
| | | 705/14.49 |
| 2007/0079138 A1* | 4/2007 | Chou ................ G06F 12/1433 |
| | | 713/186 |
| 2007/0088685 A1* | 4/2007 | Wilson ............. G06F 17/30389 |
| 2007/0288394 A1* | 12/2007 | Carrott ................... G06F 21/10 |
| | | 705/78 |
| 2008/0301002 A1* | 12/2008 | Chokov ................ G06Q 30/02 |
| | | 705/26.1 |
| 2009/0177744 A1 | 7/2009 | Marlow et al. |
| 2010/0057708 A1* | 3/2010 | Billingsley ............ G06F 17/30 |
| | | 707/E17.001 |
| 2011/0258003 A1* | 10/2011 | Brown .................. G06Q 20/10 |
| | | 705/3 |
| 2012/0030188 A1* | 2/2012 | Gutlapalli ......... G06F 17/30336 |
| | | 707/711 |
| 2013/0110828 A1* | 5/2013 | Meyerzon ......... G06F 17/30864 |
| | | 707/728 |
| 2013/0238646 A1* | 9/2013 | Maro ................... G06F 21/6227 |
| | | 707/758 |
| 2013/0291079 A1* | 10/2013 | Lowe ..................... G06F 21/00 |
| | | 726/7 |
| 2014/0032511 A1* | 1/2014 | Takahashi ......... G06F 17/30864 |
| | | 707/696 |
| 2014/0164777 A1* | 6/2014 | Wielopolski .......... H04L 9/0866 |
| | | 713/171 |

* cited by examiner

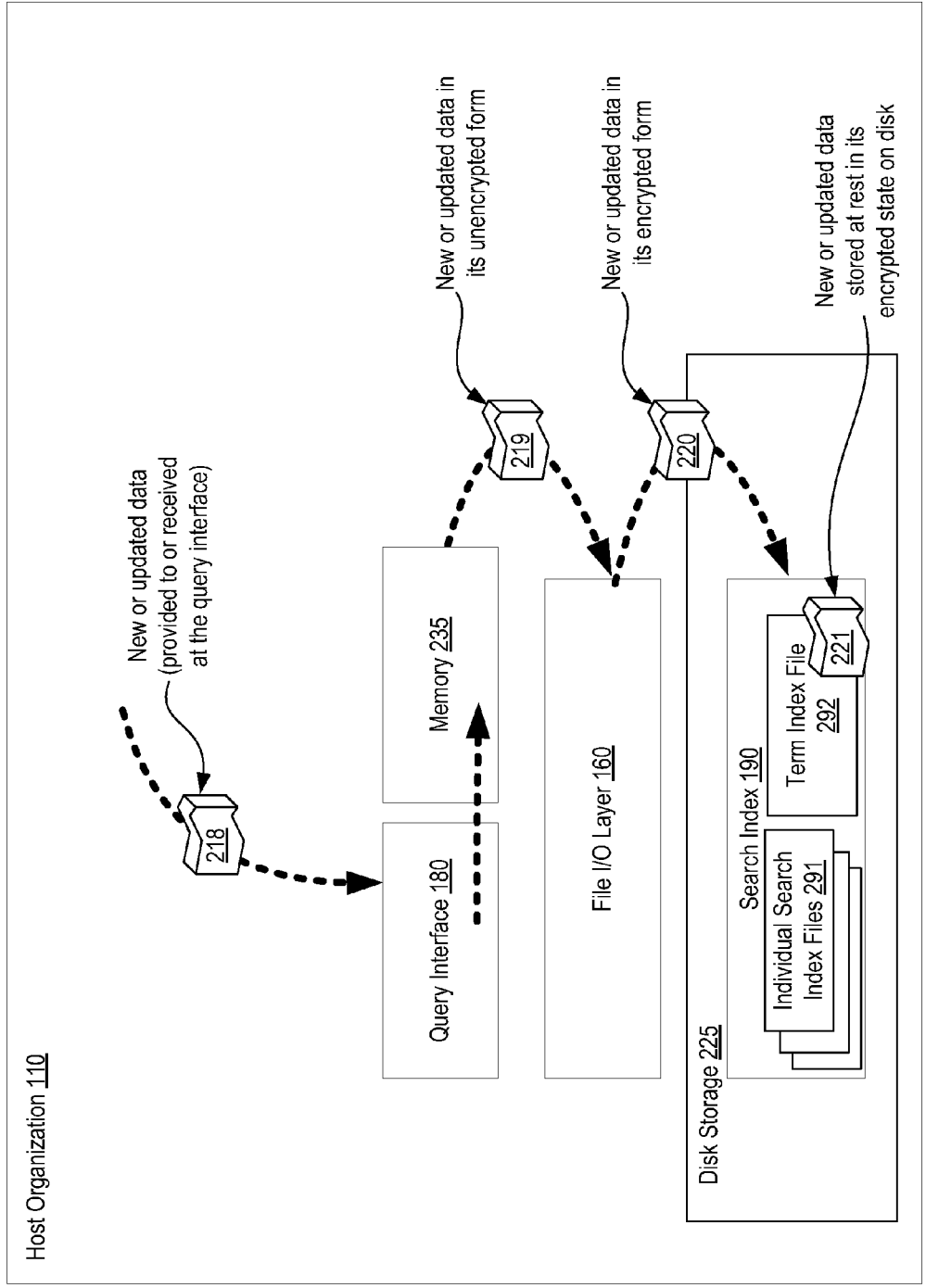

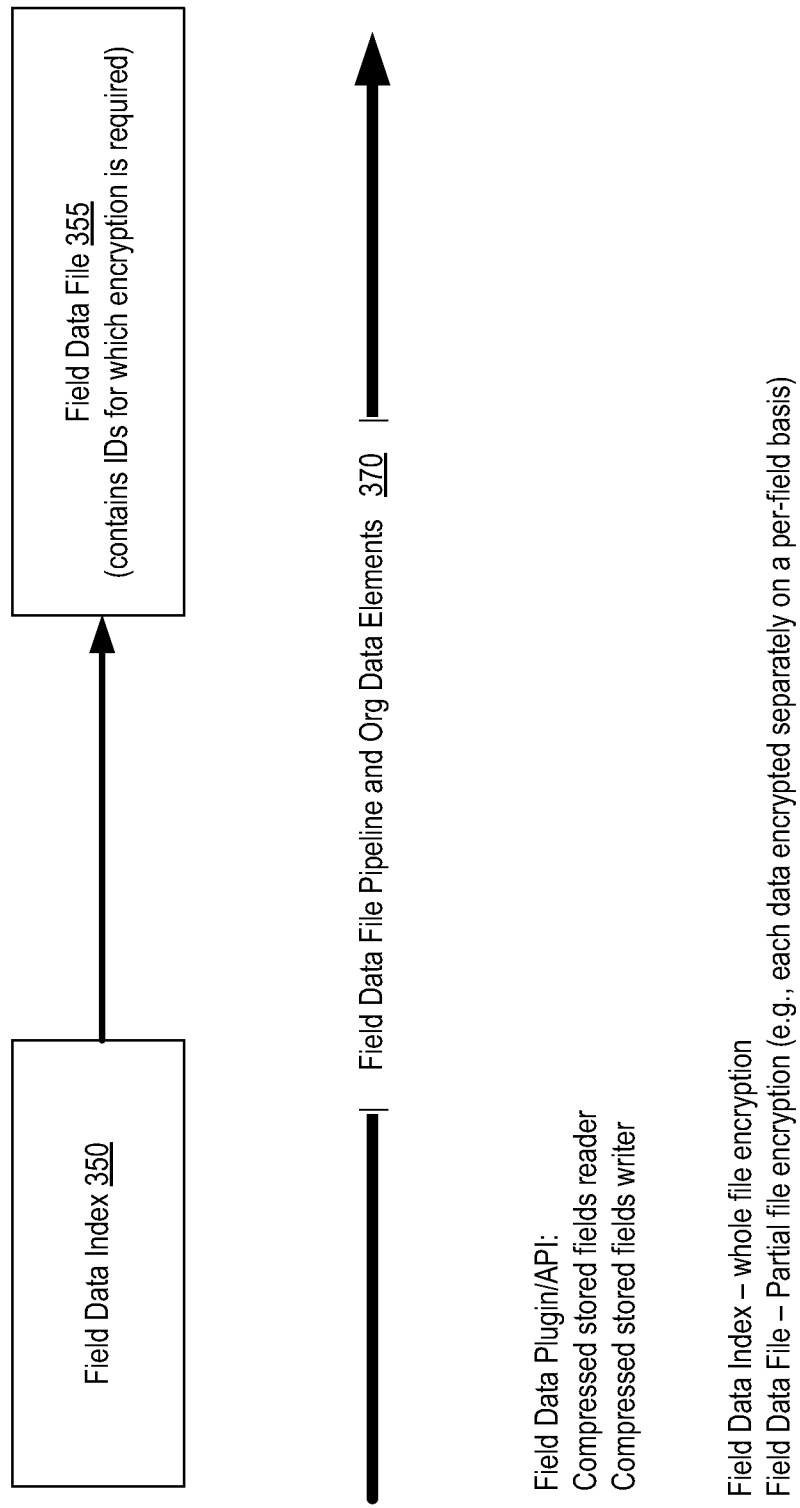

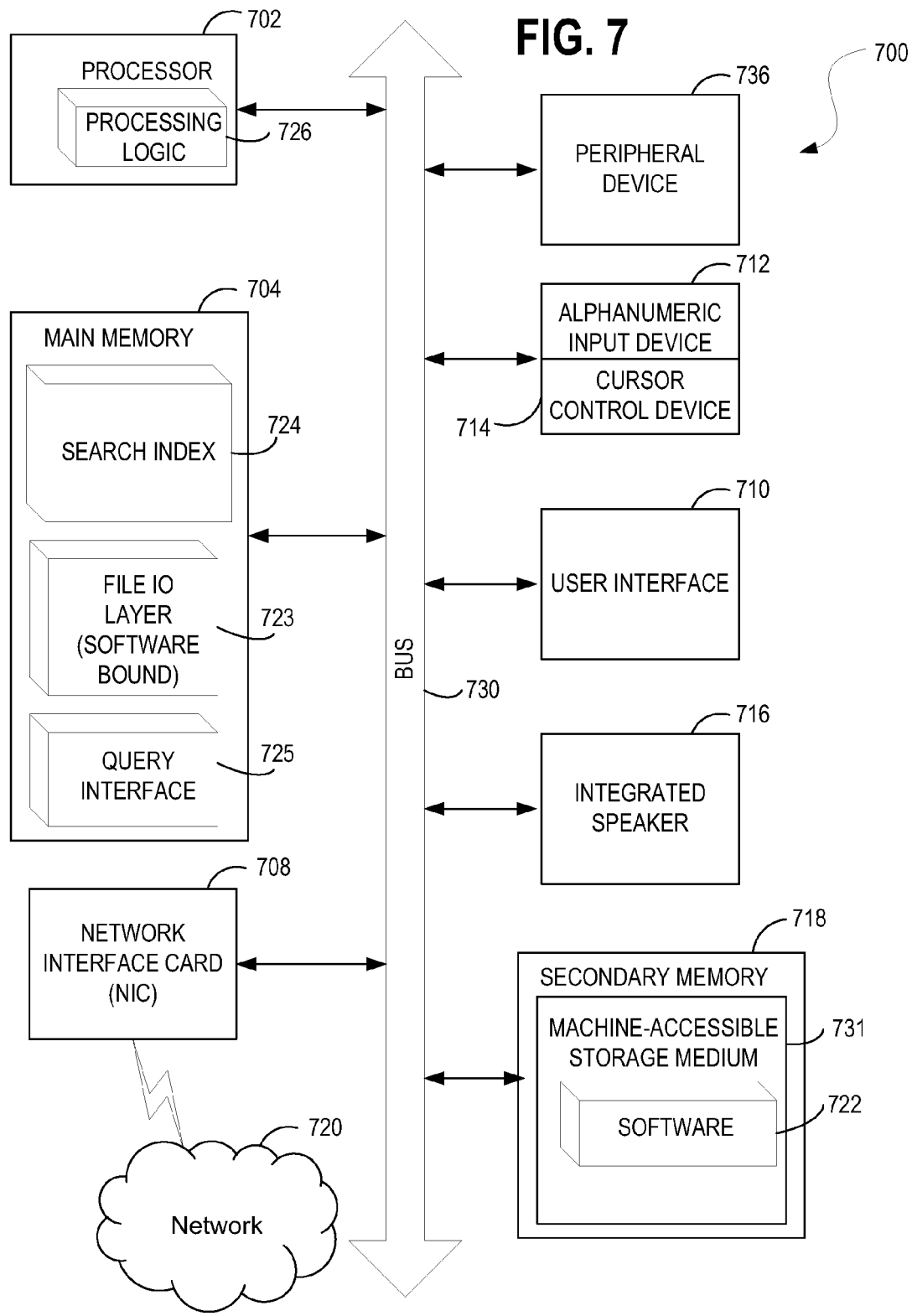

SYSTEMS AND METHODS FOR IMPLEMENTING AN ENCRYPTED SEARCH INDEX

CLAIM OF PRIORITY

Not Applicable.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems and methods for implementing an encrypted search index. Such means may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Conventionally known search indexing provides means to collect, parse, and store data so as to facilitate fast and accurate information retrieval including optimizing the speed and search performance in finding relevant documents or information responsive to a search query. The problem with conventional search indexes is that despite their usefulness, they very often contain customer information which may be sensitive in nature.

Certain existing solutions overcome this problem by crudely encrypting the entirety of an index file upon updates and additions and then again decrypting the entirety of the index file for all search indexing. While such a solution may be feasible for very small indexes, larger databases by their nature result in significantly larger search indexes, easily ranging into the hundreds of megabytes when stored on disk. Consequently, encrypting and decrypting the entirety of such large search indexes fails to scale up for larger implementations and becomes wholly infeasible after the search index files surpass a certain size on disk as the computing infrastructure simply cannot decrypt the large files and execute the requested search within an acceptable period of time.

Further still, existing solutions of encrypting the entirety of a search index leave the encrypted search index open to frequency based attacks, despite the encryption and in addition to unacceptably slowing search index processing, existing solutions relegate search to exact term processing only and eradicate any ability to perform wild card searching.

The present state of the art may therefore benefit from the systems and methods for implementing an encrypted search index as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2A depicts interactions of the query interface, the file TO layer, and the search index from FIG. 1 in additional detail;

FIG. 3B depicts a field data pipeline and elements which include organization data according to one embodiment;

FIG. 7 illustrates a diagrammatic representation of a machine in the exemplary form of a computer system, in accordance with one embodiment.

DETAILED DESCRIPTION

Figure 1:
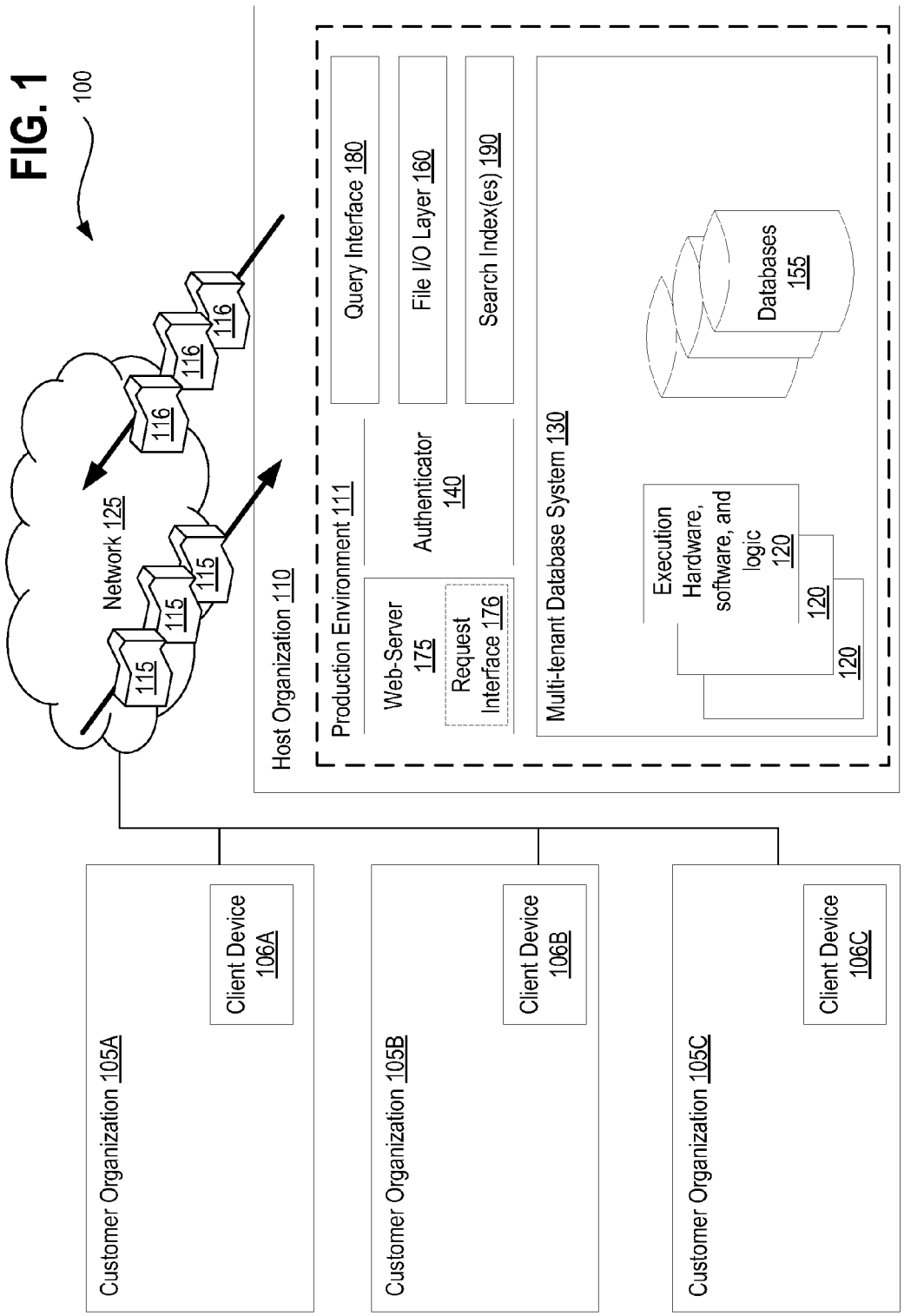
FIG. 1 depicts an exemplary architecture in accordance with described embodiments.

Described herein are systems and methods for implementing an encrypted search index. An exemplary system may include, for example: a processor and a memory to execute instructions at the system; a search index stored on disk within the system having therein a plurality of individual search index files, the search index having customer information stored therein, in which at least one of the individual search index files constitutes a term dictionary or a term index type file having internal structure which allows a portion of the individual search index file to be updated, encrypted, and/or decrypted without affecting the internal structure of the individual search index file; a file input/output (IO) layer to encrypt the customer information being written into the individual search index file and to decrypt the customer information being read from the individual search index file, in which the file TO layer encrypts and decrypts only a portion of the individual search index file in reply to an operation without requiring decryption or encryption of the individual search index file in its entirety; and a query interface to execute the operation against the customer information stored in the memory in its decrypted form.

Certain embodiments operate within a hosted computing environment, also referred to as a provider of on-demand services, on-demand database services, cloud computing services, or simply a host organization that provides services to subscribing customer organizations. Such host organizations utilize various technologies to service many different tenants (e.g., customer organizations and their users) simultaneously. Such technologies may include, for example, client-server implementations, computing grids, computing pods or pools of work machines, traditional databases, single tenancy database systems and/or multi-tenant database systems. A multi-tenant database system in particular operates to store data on behalf of a multitude of subscribers, each being a "tenant" of the database system, hence the term multi-tenant database system. Many subscribers (e.g., users or tenants) utilize the computing technologies of the host organization to access analytics, charts, views, reports, and other such data which is stored within the servers, systems, databases, and multi-tenant database system of the host organization. For instance, a sales team may utilize sales data stored within such a system or customers may generally submit data to be stored within the system and execute search queries against such a system, in which case the system returns search results.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a production environment 111 is communicably interfaced with a plurality of client devices 106A-C (e.g., such as mobile devices, smart phones, tablets, PCs, etc.) through host organization 110. In one embodiment, a multi-tenant database system 130 includes databases 155, for example, to store tables, datasets, and underlying database records with user data on behalf of customer organizations 105A-C (e.g., tenants of the multi-tenant database system 130 or their affiliated users). Customer information, including sensitive customer information, may additionally be stored within the search index(es) 190 of the host organization 110 which in turn are accessible by the query interface 180 through the file Input/Output layer (file IO layer) 160. In alternative embodiments, a client-server computing architecture may be utilized in place of the multi-tenant database system 130, search indexes 190, query interface 180, and file IO layer 160, or alternatively, a computing grid, or a pool of work servers, or some combination of hosted computing architectures may be utilized to carry out the computational workload and processing demanded of the host organization 110.

The multi-tenant database system 130 depicted in the embodiment shown includes a plurality of underlying hardware, software, and logic elements 120 that implement database functionality and a code execution environment within the host organization 110. In accordance with one embodiment, multi-tenant database system 130 further implements databases 155 to service database queries and other data interactions with the databases 155. The hardware, software, and logic elements 120 of the multi-tenant database system 130 as well as the search indexes 190, the query interface 180, and the file IO layer 160, are separate and distinct from a plurality of customer organizations (105A, 105B, and 105C) which utilize the services provided by the host organization 110 by communicably interfacing to the host organization 110 via network 125. In such a way, host organization 110 may implement on-demand services, on-demand database services or cloud computing services to subscribing customer organizations 105A-C.

Host organization 110 receives input and other requests 115 from a plurality of customer organizations 105A-C via network 125 (such as a public Internet). For example, incoming search queries, database queries, API requests, interactions with displayed graphical user interfaces and displays at the client devices 106A-C, or other inputs may be received from the customer organizations 105A-C to be processed against the multi-tenant database system 130 and/or the search indexes 190 as queries, search queries, etc., or such queries may be constructed from the requests 115 for execution against the databases 155 by the file IO layer 160 and/or the query interface 180, pursuant to which results 116 are then returned to an originator or requestor, such as a user of one of a client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its multi-tenant database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user client device 106A-C or machine originating such data requests 115.

Host organization 110 may implement a request interface 176 via web-server 175 or as a stand-alone interface to receive requests packets or other requests 115 from the client devices 106A-C. Request interface 176 further supports the return of response packets or other replies and responses 116 in an outgoing direction from host organization 110 to the client devices 106A-C.

Authenticator 140 operates on behalf of the host organization to verify, authenticate, and otherwise credential users attempting to gain access to the host organization.

Query interface 180 additionally provides functionality to pass queries from web-server 175 into the multi-tenant database system 130 for execution against the databases 155, into the search indexes 190 for processing search queries, or into the other available data stores of the host organization's production environment 111. In one embodiment, the query interface 180 implements an Application Programming Interface (API) through which queries may be executed against the databases 155, the search indexes 190, or the other data stores.

FIG. 2A depicts interactions of the query interface 180, the file IO layer, and the search index 190 from FIG. 1 in additional detail. The host organization 110 is again shown here, however, additional detail is now provided including new or updated data 218 being provided to or received a the query interface 180 via a write or update operation. Also depicted here is the search index 190 being made up of multiple individual search index files 291. For instance, one type of an individual search index file is a term index file 292.

A write or update operation may necessitate a change to information stored by an existing search index 190, thus utilizing updated data or a new individual search index file 291 or a new term index file 292 may be built and thus incorporate new data. Regardless, as is depicted here, the query interface 180 interfaces to the search index 190 and its individual search index files 291, including the term index file 292, as stored on disk storage 225 via file IO layer 160. The new or updated data in its unencrypted form 219 resides within memory 235 accessible to the query interface 180 and is passed from memory 235 by the query interface 180 to the search index 190 through file IO layer 160 which takes the new or updated data in its unencrypted form 219 encrypts it, and writes the new or updated data in its encrypted form 290 directly into the appropriate sub-portion of the corresponding individual search index file 292 or term index file 292 within the search index 190, resulting in the new or updated data in its encrypted form 220 being passed into and stored within the search index 190 on disk storage 225. Thus, element 221 depicts the new or updated data stored at rest in its encrypted state on disk.

Figure 2B:
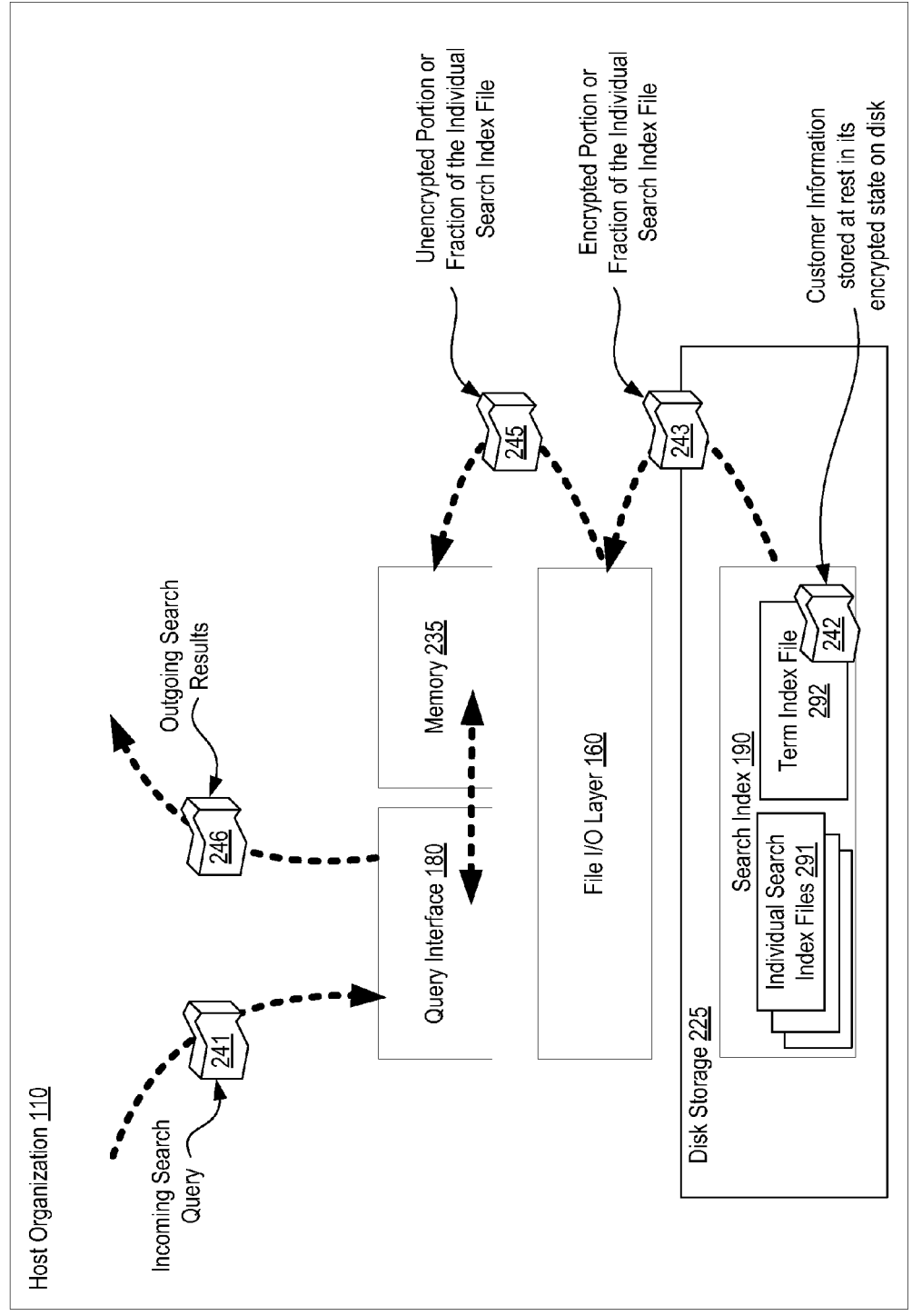
FIG. 2B depicts alternative interactions of the query interface, the file TO layer, and the search index from FIG. 1 in additional detail.

FIG. 2B depicts alternative interactions of the query interface 180, the file IO layer, and the search index 190 from FIG. 1 in additional detail. The host organization 110 is again shown here, however, additional detail is now provided with regard to retrieving information from the search index 190 while processing a received operation (e.g., such as a read-only search query operation or otherwise). As depicted, the search index 190 includes multiple individual files including the individual search index files 291 and the term index file 292 depicted here. An incoming search query 241 is received by the query interface 180 and customer information stored at rest in its encrypted state on disk 242 is retrieved from the term index file 292 via the file IO layer 160 causing the encrypted portion or fraction of the individual search index file 243 to be decrypted at the file IO layer 160 and the file IO layer 160 then in turn passes the unencrypted portion or fraction of the individual search index file 245 into memory 235 where the query interface 180 may interact with the customer information in its unencrypted state in fulfillment of the incoming search query to produce outgoing search results 246.

Figure 3A:
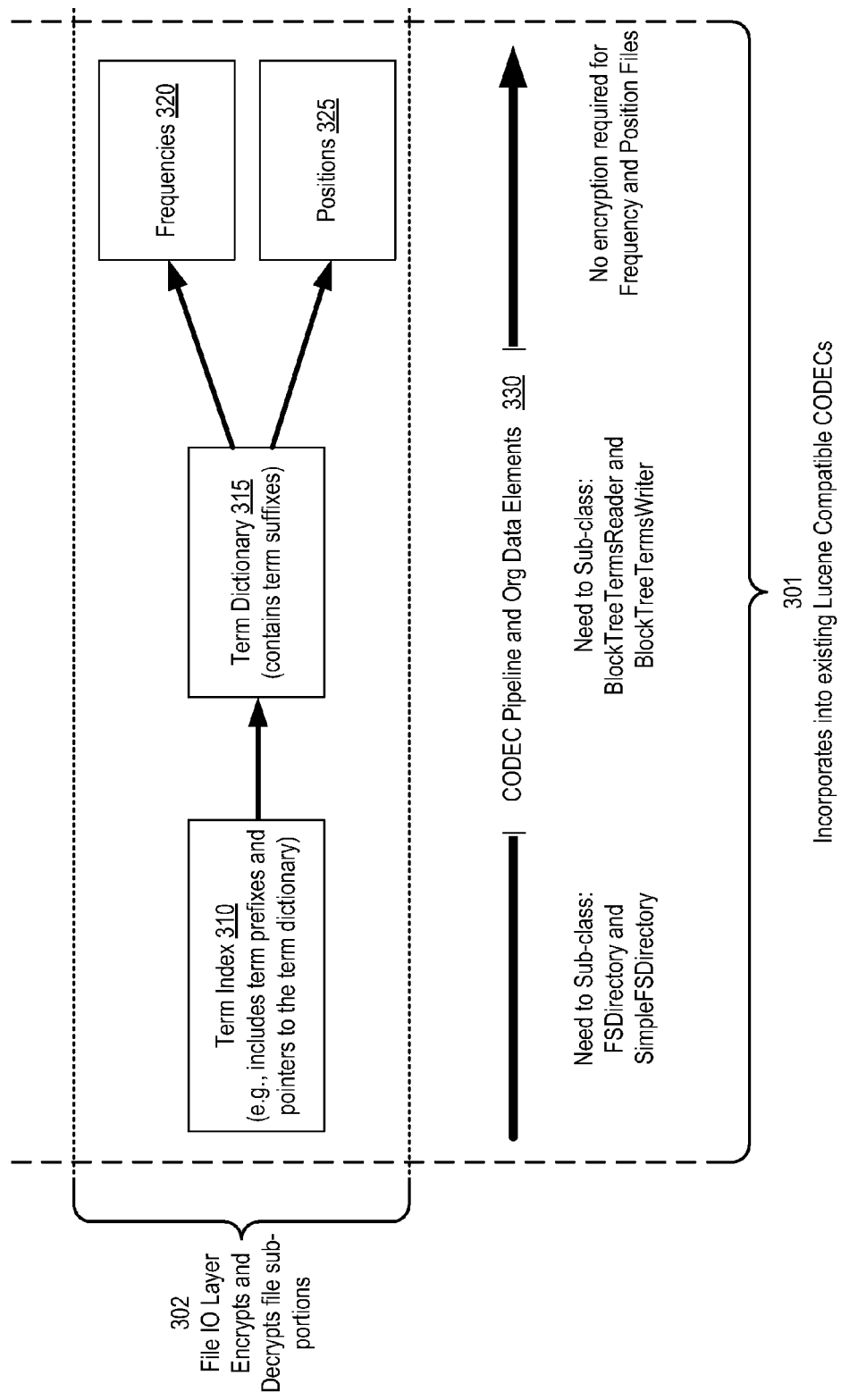
FIG. 3A depicts a CODEC pipeline and elements which include organization data according to one embodiment.

FIG. 3A depicts a CODEC pipeline and elements which include organization data 330 according to one embodiment.

The described means result in the implementation of an encrypted search index which ensures that all sensitive customer data is encrypted at rest while stored on disk. In doing so, even in the event that the index files themselves are compromised, the data will be of little value to malicious actors. Moreover, by accessing only a subset, fraction, or portion of the larger individual index search files which make up the search index itself, performance and search query processing is greatly improved as it is no longer necessary to decrypt and re-encrypt entire individual search index files every time any interaction or transaction is undertaken. For instance, for a simple search query, only a small portion affected by the query needs to be decrypted, and where an update or new information is added to the individual search index file, be it a term index or otherwise, only a portion of the total file needs to be re-encrypted which is less computationally intensive and therefore faster than re-encrypting an entire individual search index file in its entirety.

The file IO layer binds, through software, directly to the individual search index files which make up the search index and in doing so, the file IO layer is enabled to selectively encrypt data based on its type and use. This method is more precise then a general encrypted file strategy which encrypts files as a whole and is more transparent to the query interface as file IO layer abstracts away the details of file Input/Output operation from the query interface as well as from other applications, APIs, GUIs, or any other entity making use of the search index. Stated differently, the file IO layer performs its encryption/decryption behind the scenes and out of view of the query interface and other applications and selectively applies the encryption and decryption to only specific values in any given individual search index file based on the value type. Other applications, APIs, GUIs, and the query interface itself is able to operation without any knowledge that the file IO layer is encrypting or decrypting customer information stored within the search index.

A search index is broken down into multiple files, only a subset of which require encryption, and only sub-portions or fractions of those individual search index files requiring decryption and re-encryption at any given time in support of processing a received operation. Customer data within the search indexing pipeline it is treated as either terms in the term dictionary/term index type file or treated as values in the field data file. Terms are also stored in files dealing with term vectors.

In accordance with one embodiment, a Lucene compatible search index is specifically utilized which includes the following files: a segments file (e.g., segments.gen, segments_N) which stores information about segments; a lock file (e.g., write.lock) which prevents multiple IndexWriters from writing to the same file; a compound file (e.g., .dfs) which is an optional "virtual" file consisting of all the other index files for systems that frequently run out of file handles; a fields file (e.g., .fnm) which stores information about the fields; a field index file (e.g., .fdx) which contains pointers to field data; a field data file (e.g., fdt) which is specifically selected for encryption according to described embodiments, and which stores fields for documents, a term infos file (e.g., .tis) which is specifically selected for encryption according to described embodiments, and which is part of the term dictionary and stores term information; a term info index (e.g., .tii/.tip) which is specifically selected for encryption according to described embodiments, and which is the index into the term infos file; a frequencies file (e.g., .frq) which contains the list of documents which contain each term along with their frequency; a positions file (.prx) which stores position information about where a term occurs in the index; a norms file (e.g., .nrm) which encodes length and boost factors for docs and fields; a term vector index file (e.g., tvx) which is specifically selected for encryption according to described embodiments, and which stores offset into the document data file; a term vector documents file (e.g., .tvd) which is specifically selected for encryption according to described embodiments, and which provides information about each document that has term vectors; a term vector fields file (e.g., .tvf) which is specifically selected for encryption according to described embodiments, and which provides the field level info about term vectors; and a deleted documents file (e.g., .del) which provides information about which files are marked for deletion or were deleted.

Consider for example the case of an account record in which the record reflects the following information:
Account
Account Name: John Doe
Email: john.doe@domain.com
Phone: 888-888-8888
Implementation of an encrypted search index results in the above shown values being obfuscated such they cannot be determined simply by looking at the index files. For instance, if an individual search index file were reviewed, it may only reveal, according to certain embodiments, the following information:
Account
Account Name: <encrypted>
Email: <encrypted>
Phone: <encrypted>

According to the described embodiments a subset of the elements may require encryption whereas others may require no encryption. For instance, depicted along the CODEC pipeline and organizational data elements 330 are the term index 310 which includes term prefixes and pointers to the term dictionary. All of CODEC pipeline and org data elements 330 are incorporated into existing Lucene compatible CODECs 301 in accordance with the described embodiments. Term dictionary 315 includes term suffixes which maps in turn to frequencies 320 and positions 325. As depicted, the file IO layer encrypts and decrypts the file sub-portions 302 as necessary in support of the embodiments as described herein. According to a specific embodiment and implementation, it is necessary to sub-class FSDirectory and SimpleFSDirectory for the term index 310 and whole file encryption may be utilized in doing so, and it is needed to sub-class BlockTreeTermsReader and BlockTreeTermsWriter for the term dictionary 315 and partial file encryption may be utilized for doing so, in particular, only the term suffixes may be encrypted rather than encrypting and decrypting the entire term dictionary 315 in accordance with such an embodiment. Continuing with this specific exemplary embodiment, Frequencies 320 and positions 325 are not encrypted.

FIG. 3B depicts a field data pipeline and elements which include organization data 370 according to one embodiment. In particular, there is a field data index 350 and a field data file 355, the field data file 355 containing identifiers (IDs) for data that is to be encrypted according to a particular embodiment. There may additionally be provided a field data plugin or API which provides a compressed stored fields reader as well as a compressed stored fields writer. In this particular embodiment, the field data index 350 is subjected to whole file encryption with the field data file 355 being instead utilizing partial file encryption in which each data element is encrypted separately on a per-field basis.

Stored field values provides or includes, for each document, a list of attribute-value pairs, in which the attributes are field names. The stored field values are used to store auxiliary information about the document, such as its title, URL, or an identifier to access a database. The set of stored fields are returned as each positive hit occurs when searching and may be keyed by document number according to certain implementations.

Field values include customer sensitive data and are stored in two locations. For instance, the field values are stored for the purposes of indexing, which associates a term of a field with a document in the term index/dictionary. The field values are additionally included or stored as the field value as a whole and associated with a query result for use later. For example, if a search for "release information" is performed and it shows up in the description of an account object, and the description is chosen to be in the field data file, then the entire description as a whole can be returned with the rest of the query results and displayed to a user or provided responsive to a query if field values are explicitly specified to be stored in support of such an implementation.

According to various embodiments, certain files may be subjected to whole file encryption, others not encrypted at all, and yet others subjected to partial file encryption in which only a subset of information is read or retrieved, decrypted, manipulated, re-encrypted, and replaced into the file without encrypting or decrypting the file in its entirety and without disrupting the existing structure of the file subjected to partial encryption. Alternatively, it may be that information does not yet exist in a file subjected to partial encryption, and thus, the data is encrypted and written to the file in a first instance but again, this is done without encrypting or decrypting the file in its entirety and without disrupting the existing structure of the file subjected to partial encryption. Additionally, certain operations or transactions are read only and thus, information is read or retrieved and decrypted, but this is done without decrypting the entirety of the file and without disrupting the existing structure of the file subjected to partial encryption/decryption.

According to a specific embodiment, the following files are encrypted:
1) Term Dictionary (.tim) by encrypting the term suffixes in each term block (e.g., partial encryption);
2) Term Index (.tip) by encrypting the entire file (e.g., whole file encryption);
3) Field Data (.fdt) with encryption according to each <attribute, value> pair, encrypting the given value.

According to such an embodiment, the following files are optionally but not necessarily encrypted:
4) Term Vector Documents .tvd which contain information about each document that has term vectors.

According to an alternative embodiment, a hybrid approach is utilized which includes encrypting suffix bytes in each term block of the term dictionary (e.g., term index file 292 at FIG. 2B or term dictionary 315 at FIG. 3B). Because the term suffixes reside within in the same block in the file (e.g. if a block has 23 terms in it, the suffixes are all in one contiguous block), all term suffixes are encrypted and decrypted as a single block via a single pass in accordance with certain embodiments. Additionally, by encrypting suffixes per contiguous block, it is only necessary to decrypt blocks that are affected, utilized, and/or referenced by the transaction, operation, or search query in question, as directed by the term index, rather than requiring decryption of the term dictionary (e.g., term index file 292 at FIG. 2B or term dictionary 315 at FIG. 3B) in its entirety, or the decryption of an entire search index file which can be many hundreds of megabytes in size and thus represent a large computational overhead cost as well as a delay in returning the result set to a user querying for such information. Encryption of the entire Term index (.tii/.tip) file, and loading of the entire file into memory may still be carried out at the directory level to further improve operational efficiency and speed and is therefore reverse compatible with conventional tools.

Values of the field data file (.fdt) may be encrypted. The field data file (.fdt) provides a set of key value pairs where the keys correspond to fields and where the values represent or specify further information about those fields. Since the fields themselves are not encrypted within the host organization and the values may include customer sensitive data, such data will also be encrypted in accordance with particular embodiments.

Notwithstanding the encryption, individual search index files may nevertheless remain accessible as a random access file, including a term index type file. The structure of large files is preserved yet permits for encryption of customer sensitive data within the document. With the overall structure of the file preserved, the file remains operational as a random access file, permitting random access to specified parts of a large file without having to encrypt/decrypt the file as a whole for each operation. Moreover, vulnerability of customer sensitive information to frequency based attacks is greatly reduced by organizing and separating customer sensitive data into blocks and within those blocks dividing the block into sub blocks. Sub blocks are separated based on what is customer data and what is not customer data. For instance, according to certain embodiments, customer and non-customer data do not share the same sub-block and are thus divided accordingly. By organizing data in such a way and encrypting the sub block that contains customer data, then even in the event that malicious actors sees the non customer sensitive data in another sub block, it can't directly associated with any specifically encrypted term, because all terms are encrypted as a single contiguous block, rendering the ill gained access valueless to a hacker, intruder, or other malicious actor.

By applying the above two techniques to search index operations, search indexes and search for information within such indexes are built and maintained in such a way that ensures customer sensitive information is encrypted and protected while at rest on disk within the file system.

In the unlikely event that a search server is nevertheless accessed by a malicious user, hacker, etc., then the customer data within the search index files would be accessible in a readable format without encryption of the search indexes being implemented. Without encryption, the individual search index files could be used to recreate customer documents that are meant to be encrypted elsewhere in within the host organization's infrastructure. Existing solutions call for encrypting entire index files (e.g., files that are retrieved and referenced as part of a search query) as a whole but these prior solutions are unworkable within a large scale hosted computing environment such as that provided by salesforce.com due to the massive datasets maintained and serviced. Moreover, prior solutions require the encryption of not only customer data, but the encryption of entire files, even if only a fraction of a file is needed, referenced, or changed. Since encryption takes time and costs real dollars by expending computer processing cycles as overhead, implementing encryption of the search index in the least amount of processing cycle time and computing cost possible is necessary to meet usability requirements for search.

The write operation will take customer data, a key, and an Initialization Vector (IV) and encrypt this information and store it on disk within the host server. The customer data may arrive as an update request or a record insert with read operations implying a search query (e.g., read only) and with write operations implying that index documents are being received and added to the search index Inside the structure of a given individual search index file, such as the term index, if there are 23-24 terms, and if each term is encrypted individually then file is vulnerable to frequency attacks. For instance, if the same term is viewed 50 times then it is probably a pronoun, for instance, maybe "the" etc., and thus, the file and the customer's data within is still subject to some level of damage or harm despite the encryption of the individual terms.

Described embodiments therefore encrypt the terms all together and so a malicious actor (e.g., a hacker, etc.) will just see a long block of encrypted text but does not know which term is which unless he is able to decrypt the entire string or block, which cannot be done in the absence of the key. For instance, if there are 100 blocks, the structure is kept in-tact. The file includes pointers and if only one small piece of the block with the customer information is needed to perform the operation or search query, then only that small piece of the block is decrypted when it is needed without decrypting the entire file. In reply to a search query, instead of having to decrypt the entire file, if it is only ~3 blocks that are required to perform the search query then only those ~3 blocks are decrypted.

According to the described embodiments, implementing an encrypted search index further enables enhanced search capabilities over conventional means. For instance, implementing the encrypted search index enables exact term search and wildcard search, each of which may not function correctly with conventional means.

An example of exact term search is searching for "JOE" in which the exact term is entered and processed through the search pipeline and eventually the search operation hits the term index file and positively hits or locates the term "JOE" and returns blocks that are relevant to that term. So the search for JOE may identify blocks 2, 3, and 6, and return those blocks. With the blocks returned, the search operation knows where the file pointers are and decrypts the blocks upon receipt or retrieval (e.g., via the file IO layer, etc.). When a query arrives and a search is performed using an appropriate key, eventually the query will hit the term index file and the key is utilized to decrypt the term index file as well as the term dictionary, each being pulled from disk and decrypted through the file IO layer.

Once decrypted and resident in memory, conventional operations may be utilized to access and reference the decrypted data, and in such a way, the improvements made to encrypting the pipeline have no ill effect upon the query interface, applications, GUIs, APIs, etc., with each of such entities performing as usual when information is being pulled from disk because the file IO layer makes these retrieval and decryption/encryption operations transparent or out of view of such entities. For instance, when the term index file it is decrypted via the file IO layer and when the pointers are referenced the corresponding files (e.g., the files pointed to by such pointers) are located and retrieved and again, the decryption happens automatically by the file IO layer.

According to described embodiments, the file IO layer is a software interface bound to the particular individual search index files of the search index and operates as a barrier between the disk and the memory. The moment operations are executed to read or write to disk, the decryption and encryption is performed automatically and transparently by such a file IO layer. Conventional solutions retrieve the file, decrypt the file, and work with the data of the file, and then re-encrypt the entire file and write the entire file back to disk in its encrypted state. Conversely, the file IO layer pull blocks or sub-portions of the file, decrypts those blocks/sub-portions, and works with them before re-encrypting only those blocks or sub-portions and writing only those blocks and sub-portions back into the original file in an encrypted state, permitting the original file to retain its original internal structure. For instance, the structure of the term index or other individual search index files making up the search index are not modified, only the contents of the blocks or sub-elements within them, as necessary, to complete a particular operation, transaction, or search query. The search index files have their own built in internal structure, similar to files that are paged or tagged or marked in someway or otherwise have structure around them. The search index files as described herein are not meant to be read into memory in their entirety, and thus, the problem with decryption is that by decrypting the entire file, it is not only time intensive and wasteful, but it additionally impairs the operation of other entities which utilize the search index, such as the query interface, APIs, other applications, GUIs, etc.

Suffixes provide the organization information, so if the search strings "JOE" or "BLONDE" were specified, then those names and terms would be encrypted in the term dictionary resulting in a broader term dictionary. The next subset is blocks within the dictionary and then within the respective blocks there are a contiguous set of statistics regarding those terms and then a continuous set of descriptive information pertaining to the blocks. Thus, encrypting the term or the suffix byte according to certain embodiments requires only encrypting those bytes and the randomness of the data is otherwise maintained without having to pull up the entire search index file. Importantly, the structure of the search index file is also preserved and the volume of data that requires encrypting and decrypting drops substantially in contrast with conventional methodologies.

Search functionality utilizing wildcarding is additionally preserved with the implementation of an encrypted search index as described herein, whereas such functionality is destroyed utilizing conventional encryption solutions. With wildcards a search is performed on a prefix tree, and within a path and everything associated with, for example, "J" is located, which may correspond to any of "JOE,' or "JAMES," or "JACKIE," etc. The search may be further specified as "JA" and then the terms that it corresponds to is JAMES and JACKIE and if the search is still further narrowed to "JAM" then only JAMES corresponds to the search according to this particular example. Use of the prefix tree is well known, but the problem is that if the prefix tree is encrypted, then it will not match the various partial results. It may be possible to match a complete sting, but not partial search strings relying upon wildcarding. For example, because the encrypting randomizes the data, searching for "J" and then "JA" and then "JAM" will take the search down a random path and hit random results because plaintext wildcarding search parameters are being utilized against an encrypted target, thus breaking or destroying wild card search functionality. However, implementation of an encrypted search index as described herein permits wild card functionality to continue to function because after the file IO layer pulls the relevant files from disk and places them into memory in a decrypted state, with the encryption and decryption occurring transparently between the memory and disk by the file IO layer, it is not necessary for any other search query interface, API, GUI, etc., to make special accommodation for the presence of encryption because they are not exposed to the encrypted data when transacting with the target data within memory. Thus, when the search is performed, even using wild cards, it does not encounter the randomness of encryption in the data, but rather, it encounters the expected information in its decrypted state in memory, and requires no special handling for such a query interface, API, and GUI type entities.

Figure 4:
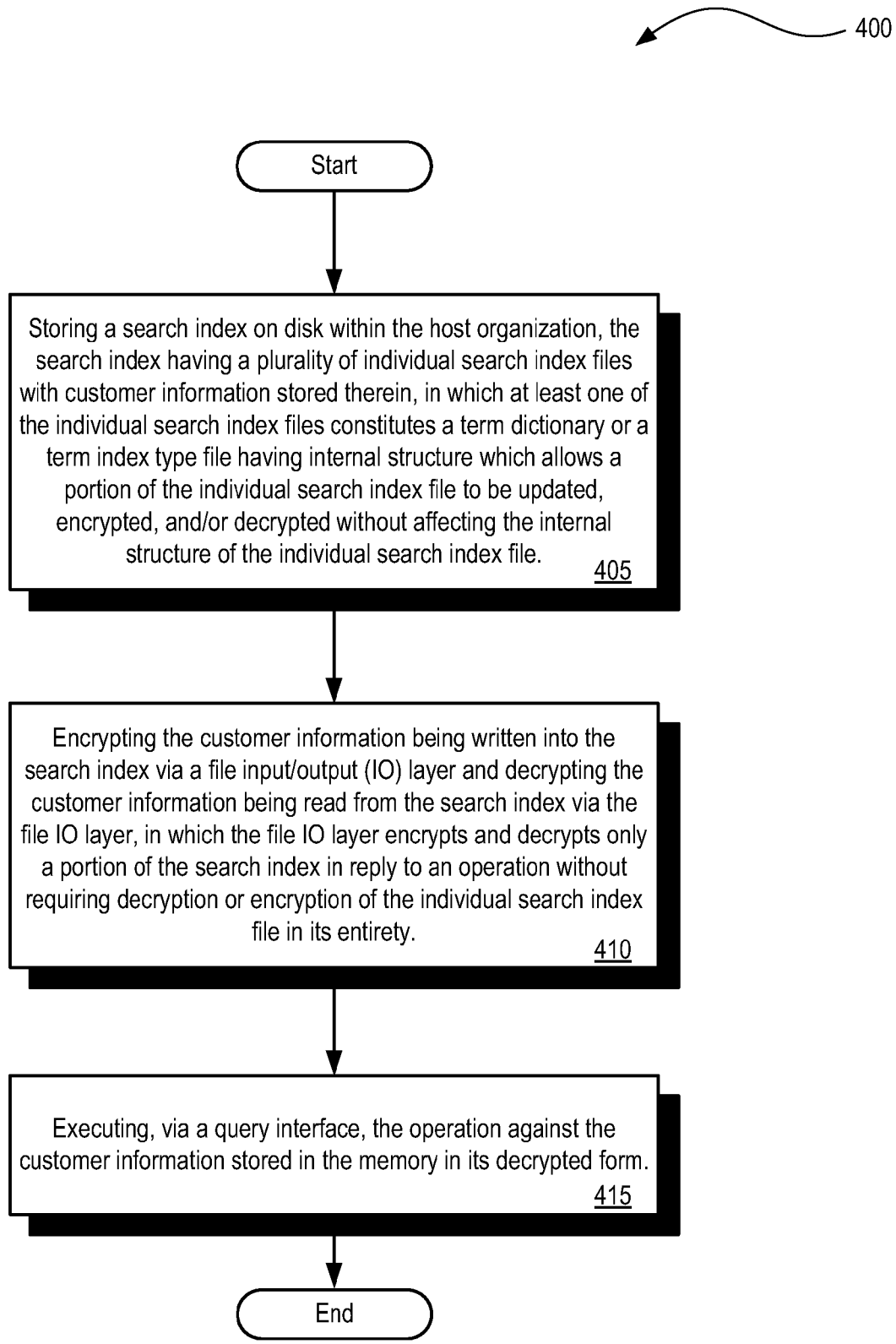
FIG. 4 is a flow diagram illustrating a method for implementing an encrypted search index in accordance with disclosed embodiments.

FIG. 4 is a flow diagram illustrating a method 400 for implementing an encrypted search index in accordance with disclosed embodiments. Method 400 may be performed by processing logic that may include hardware (e.g., circuitry, dedicated logic, programmable logic, microcode, etc.), software (e.g., instructions run on a processing device) to perform various operations such as storing, querying, receiving, encrypting, decrypting, processing, executing, providing, determining, triggering, displaying, retrieving, communicating, updating, transmitting, sending, returning, etc., in pursuance of the systems and methods as described herein. For example, the computing architecture (e.g., within production environment 111) of host organization 110 as depicted at FIG. 1, the system 500 at FIG. 5, the environments 698 and 699 at FIGS. 6A and 6B respectively, or the machine 700 at FIG. 7, may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 405, processing logic stores a search index on disk within the host organization, the search index having a plurality of individual search index files with customer information stored therein, in which at least one of the individual search index files constitutes a term dictionary or a term index type file having internal structure which allows a portion of the individual search index file to be updated, encrypted, and/or decrypted without affecting the internal structure of the individual search index file.

At block 410, processing logic encrypts the customer information being written into the search index via a file input/output (IO) layer and decrypting the customer information being read from the search index via the file IO layer, in which the file IO layer encrypts and decrypts only a portion of the search index in reply to an operation without requiring decryption or encryption of the individual search index file in its entirety.

At block 415, processing logic executes, via a query interface, the operation against the customer information stored in the memory in its decrypted form.

According to another embodiment, method 400 further includes: receiving the customer information in its decrypted state into the memory from the file IO layer in advance of executing the operation against the customer information in the memory.

According to another embodiment of method 400, the individual search index file includes a plurality of terms delineated by internal structure of the individual search index file, each term corresponding to at least a value for the term and a field within which the term is maintained; and in which method 400 further includes: dividing the individual search index file into blocks, and dividing the blocks into sub-blocks within which the customer data of the individual search index file and the non-customer data of the individual search index file do not share any same sub-block.

According to another embodiment of method 400, the host organization implements the method via computing architecture of the host organization including at least the processor and the memory; in which a user interface operates at a user client device remote from the host organization and communicatively interfaces with the host organization via a public Internet; in which the operation is received at the user interface of the user client device and communicated to the host organization via the public Internet; and in which the host organization operates as a cloud based service provider to the user client device.

According to another embodiment of method 400, the host organization provides a multi-tenant database system which implements the search index executing via computing architecture of the host organization, the multi-tenant database system having elements of hardware and software that are shared by a plurality of separate and distinct customer organizations, each of the separate and distinct customer organizations being remotely located from the host organization.

In accordance with a particular embodiment, there is non-transitory computer readable storage media having instructions stored thereon that, when executed by a processor of a system, the instructions cause the system to perform operations including: storing a search index on disk within the host organization, the search index included of a plurality of individual search index files and having customer information stored therein, in which at least one of the individual search index files constitutes a term dictionary or a term index type file having internal structure which allows a portion of the individual search index file to be updated, encrypted, and/or decrypted without affecting the internal structure of the individual search index file; encrypting the customer information being written into the search index via a file input/output (IO) layer and decrypting the customer information being read from the search index via the file IO layer, in which the file IO layer encrypts and decrypts only a portion of the search index in reply to an operation without requiring decryption or encryption of the individual search index file in its entirety; and executing, via a query interface, the operation against the customer information stored in the memory in its decrypted form.

Figure 5:
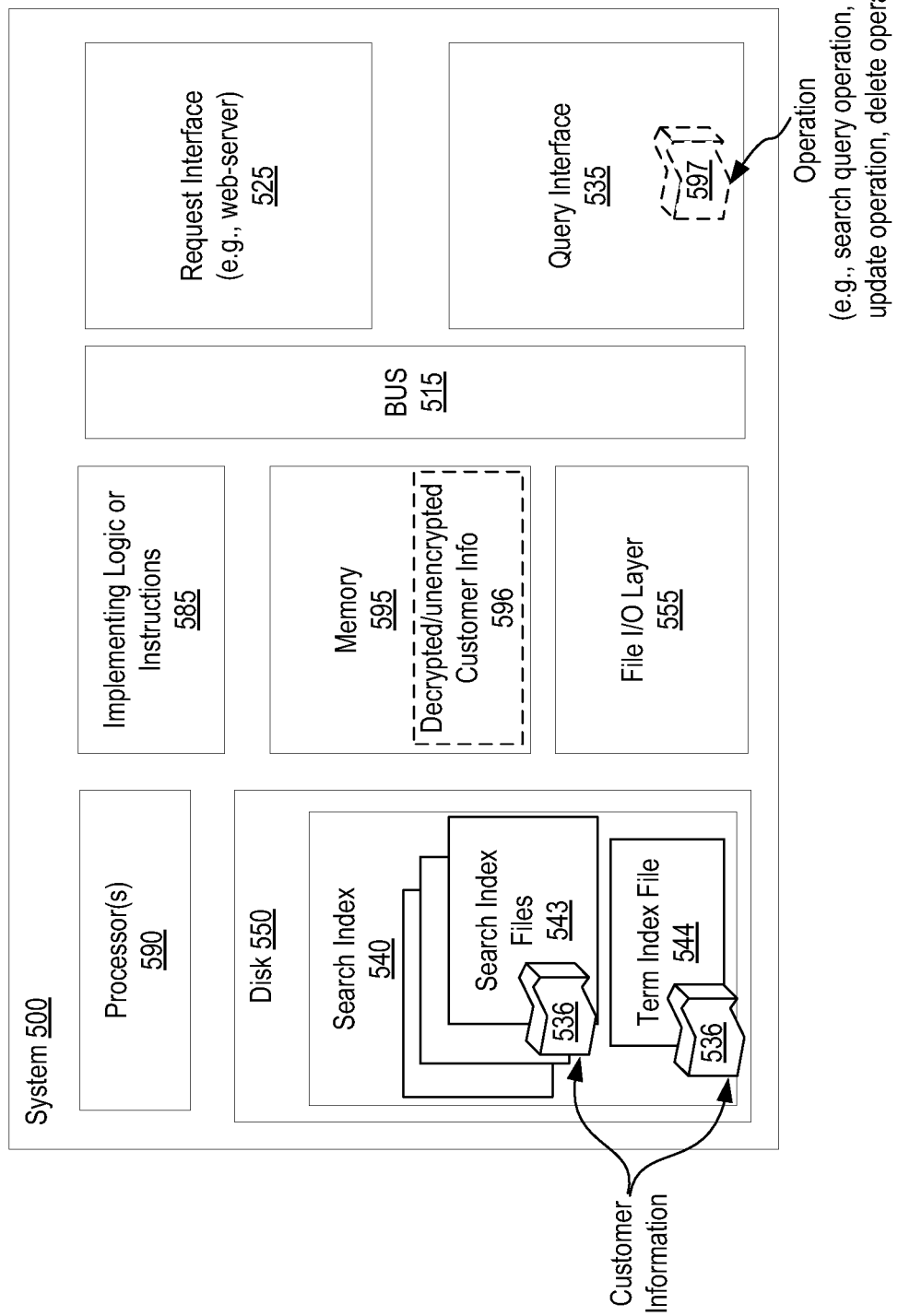
FIG. 5 shows a diagrammatic representation of a system in accordance with which embodiments may operate, be installed, integrated, or configured.

FIG. 5 shows a diagrammatic representation of a system 500 in which embodiments may operate, be installed, integrated, or configured.

In accordance with one embodiment, there is a system 500 having at least a processor 590 and a memory 595 therein to execute implementing logic and/or instructions 585. Such a system 500 may execute within a hosted computing environment, such as a host organization, a multi-tenant environment, an on-demand service provider, a cloud based service provider, a client-server environment, etc.

According to the depicted embodiment, the system 500 includes the processor 590 and the memory 595 to execute instructions at the system 500; a search index 540 stored on disk 550 within the system 500 having therein a plurality of individual search index files 543, the search index 540 having customer information stored therein 536, in which at least one of the individual search index files 543 constitutes a term dictionary or a term index type file 544 having internal structure which allows a portion of the individual search index file (e.g., 543 or 544) to be updated, encrypted, and/or decrypted without affecting the internal structure of the individual search index file (e.g., 543 or 544); a file input/output (IO) layer 555 to encrypt the customer information 536 being written into the individual search index file (e.g., 543 or 544) and to decrypt the customer information 536 being read from the individual search index file (e.g., 543 or 544), in which the file IO layer 555 encrypts and decrypts only a portion of the individual search index file (e.g., 543 or 544) in reply to an operation 597 without requiring decryption or encryption of the individual search index file (e.g., 543 or 544) in its entirety; and a query interface 535 to execute the operation against the customer information 536 stored in the memory 595 in its decrypted form 596.

According to another embodiment, the memory 595 of system 500 is to receive the customer information in its decrypted form from file IO layer during the process of receiving and processing the operation against the search index, the operation affecting at least the individual search index file amongst the plurality of individual search index files which make up the search index.

According to another embodiment of system 500, the file IO layer 555 is to encrypt and decrypt the customer information given an encryption key and Initialization Vector (IV), in which the search processing components interacting with the file IO layer will receive decrypted customer data from the individual search index file when given a correct encryption key and IV and continue processing the operation and creating search results without any further knowledge of what or how encryption occurs within the disk's file system.

According to another embodiment of system 500, the file IO layer is a software implemented interface layer to encrypt and decrypt the customer information from at least the individual search index file of the search index at the IO level by interacting directly with and being bound uniquely to one or more of the plurality of individual search index files within the search index.

According to another embodiment of system 500, the operation is an update operation including at least a write operation of new or updated customer information into the individual search index file of the search index; in which the memory receives the customer information in its decrypted state via the file IO layer after receipt and during processing of the update operation as part of creating a return result responsive to the update operation; in which the query interface executes the update operation against the customer information in the memory in its decrypted state including at least performing the write operation of the new or updated customer information in the memory; and in which the file IO layer encrypts the customer information in the memory having at least the update or the addition thereto and writes the encrypted customer information back into the individual search index file of the search index.

According to another embodiment of system 500, the operation includes a read-only search query operation of the customer information previously stored in the individual search index file of the search index; in which the memory receives the customer information in its decrypted state via the file TO layer after receipt and during processing of the read-only search query operation as part of creating a return result responsive to the read-only search query operation; in which the query interface executes the read-only search query operation against the customer information in the memory in its decrypted state; and in which the file TO layer takes no further action on the customer information in the memory in its decrypted state subsequent to execution of the read-only search query operation.

According to another embodiment of system 500, the read-only search query operation includes one of an exact term search or a wild card search, and in which the exact term search or the wild card search is performed by the query interface against the customer information in its decrypted state in the memory.

According to another embodiment of system 500, the search index is an Apache Lucene compatible type index to which random access is made to sub-portions of individual search index files within the search index and to which updates to the sub-portions of the individual search index files within the search index are made without affecting an internal structure of any individual search index file being accessed or updated within the search index.

According to another embodiment of system 500, the individual search index files include a plurality of terms delineated by internal structure of the search index, each term corresponding to at least a value for the term and a field within which the term is maintained.

According to another embodiment of system 500, the individual search index file is divided into blocks and further in which the blocks are divided into sub-blocks within which the customer data of the individual search index file and the non-customer data of the search index do not share any same sub-block.

According to another embodiment of system 500, the file TO layer encrypts all terms of the individual search index file as a single contiguous block including the customer data at rest as stored on disk within the individual search index file to reduce vulnerability of the customer data to frequency based attacks and/or reconstruction of the customer data from the search index.

According to another embodiment of system 500, each term is marked with term information and a term suffix in accordance with an Apache Lucene compatible type index.

According to another embodiment of system 500, the customer information includes sensitive customer data having at least one of the following represented therein: customer name, customer telephone number, customer email address, customer mailing address, customer salary data, customer financial data, customer heath records data, customer order history, customer preference data, customer payment information, and/or customer calendar data.

According to another embodiment of system 500, the individual search index file and storage of the customer information within the search index is implemented via the plurality of individual search index files as stored on disk within the system which are selectively retrieved and/or updated during the process of adding index documents or executing operations including search queries, add operations, delete operations, and update operations; and in which the query interface is operable to submit queries, including the operation, against the search index.

According to another embodiment of system 500, the database includes a multi-tenant database system implemented by the host organization to store customer data and search index metadata on behalf of a plurality of separate and distinct customer organizations which utilize the multi-tenant database system; and in which each of the plurality of separate and distinct customer organizations which utilize the multi-tenant database system constitutes an entity selected from the group consisting of: a separate and distinct remote organization, an organizational group within the host organization, a business partner of the host organization, or a customer organization that subscribes to cloud computing services provided by the host organization.

Bus 515 interfaces the various components of the system 500 amongst each other, with any other peripheral(s) of the system 500, and with external components such as external network elements, other machines, client devices, etc., including communicating with such external devices via a network interface over a LAN, WAN, or the public Internet. Query interface 535 provides functionality to pass queries from the request interface 525 (e.g., web-server) into a multi-tenant database system for execution against its databases or other data stores of the host organization's production environment as depicted in additional detail at FIG. 1.

Figure 6A:
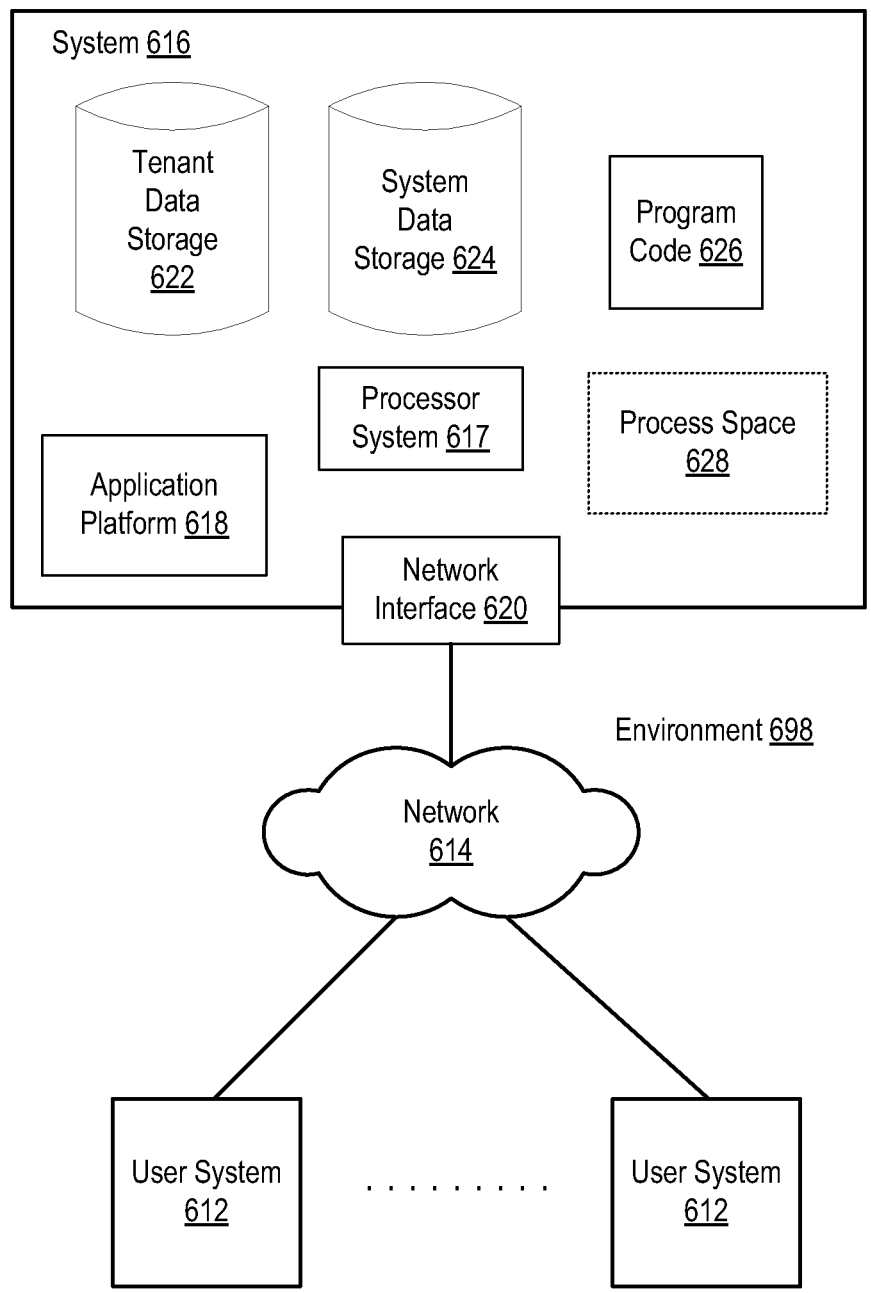
FIG. 6A illustrates a block diagram of an environment in which an on-demand database service may operate in accordance with the described embodiments.

FIG. 6A illustrates a block diagram of an environment 698 in which an on-demand database service may operate in accordance with the described embodiments. Environment 698 may include user systems 612, network 614, system 616, processor system 617, application platform 618, network interface 620, tenant data storage 622, system data storage 624, program code 626, and process space 628. In other embodiments, environment 698 may not have all of the components listed and/or may have other elements instead of, or in addition to, those listed above.

Environment 698 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6A (and in more detail in FIG. 6B) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6A, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6A, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6A include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6B:
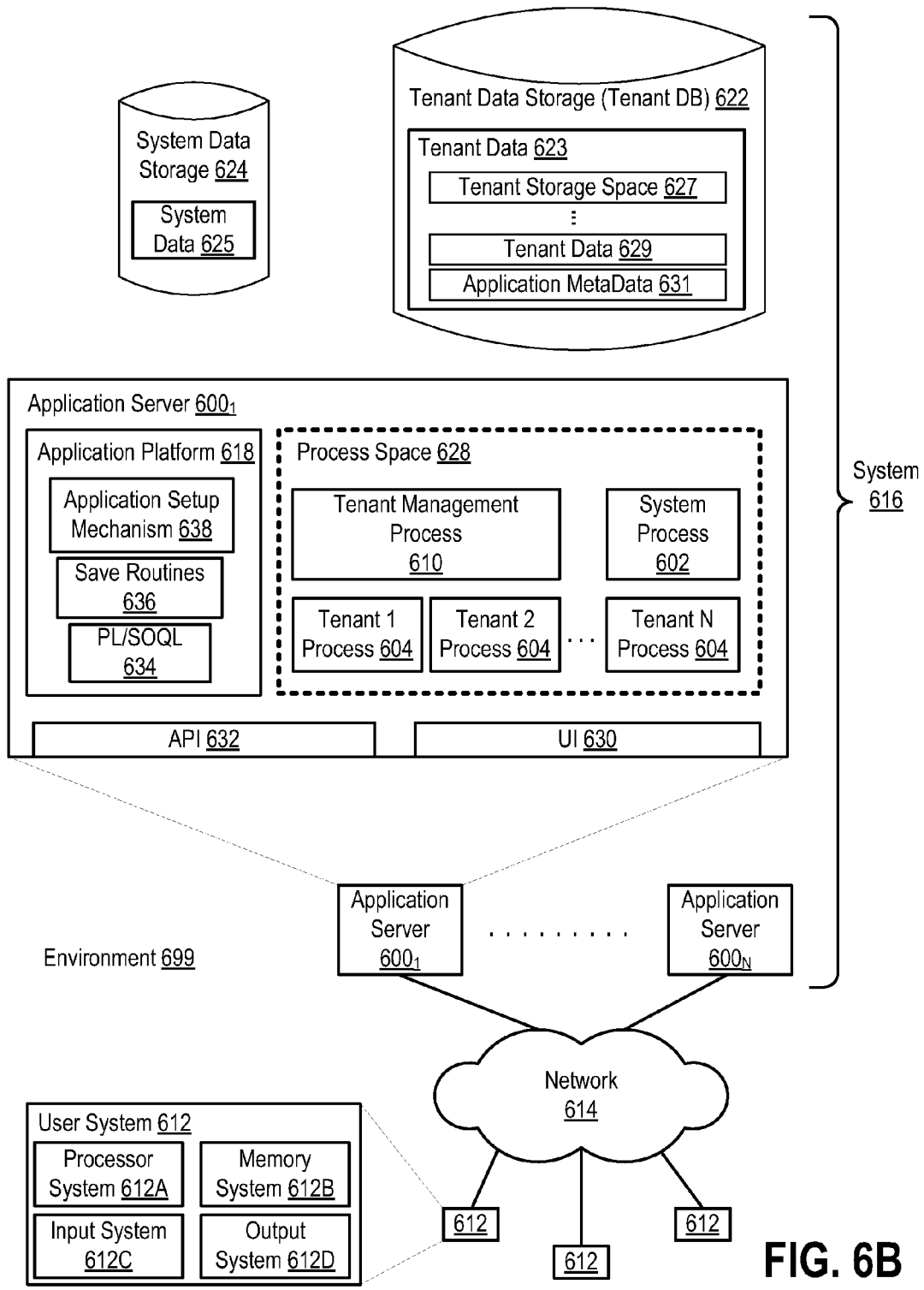
FIG. 6B illustrates another block diagram of an embodiment of elements of FIG. 6A and various possible interconnections between such elements in accordance with the described embodiments.

FIG. 6B illustrates another block diagram of an embodiment of elements of FIG. 6A and various possible interconnections between such elements in accordance with the described embodiments. FIG. 6B also illustrates environment 699. However, in FIG. 6B, the elements of system 616 and various interconnections in an embodiment are illustrated in further detail. More particularly, FIG. 6B shows that user system 612 may include a processor system 612A, memory system 612B, input system 612C, and output system 612D. FIG. 6B shows network 614 and system 616. FIG. 6B also shows that system 616 may include tenant data storage 622, having therein tenant data 623, which includes, for example, tenant storage space 627, tenant data 629, and application metadata 631. System data storage 624 is depicted as having therein system data 625. Further depicted within the expanded detail of application servers $600_{1-N}$ are User Interface (UI) 630, Application Program Interface (API) 632, application platform 618 includes PL/SOQL 634, save routines 636, application setup mechanism 638, process space 628 includes system process space 602, tenant 1-N process spaces 604, and tenant management process space 610. In other embodiments, environment 699 may not have the same elements as those listed above and/or may have other elements instead of, or in addition to, those listed above.

User system 612, network 614, system 616, tenant data storage 622, and system data storage 624 were discussed above in FIG. 6A. As shown by FIG. 6B, system 616 may include a network interface 620 (of FIG. 6A) implemented as a set of HTTP application servers 600, an application platform 618, tenant data storage 622, and system data storage 624. Also shown is system process space 602, including individual tenant process spaces 604 and a tenant management process space 610. Each application server 600 may be configured to tenant data storage 622 and the tenant data 623 therein, and system data storage 624 and the system data 625 therein to serve requests of user systems 612. The tenant data 623 might be divided into individual tenant storage areas (e.g., tenant storage space 627), which can be either a physical arrangement and/or a logical arrangement of data. Within each tenant storage space 627, tenant data 629, and application metadata 631 might be similarly allocated for each user. For example, a copy of a user's most recently used (MRU) items might be stored to tenant data 629. Similarly, a copy of MRU items for an entire organization that is a tenant might be stored to tenant storage space 627. A UI 630 provides a user interface and an API 632 provides an application programmer interface into system 616 resident processes to users and/or developers at user systems 612. The tenant data and the system data may be stored in various databases, such as one or more Oracle™ databases.

Application platform 618 includes an application setup mechanism 638 that supports application developers' creation and management of applications, which may be saved as metadata into tenant data storage 622 by save routines 636 for execution by subscribers as one or more tenant process spaces 604 managed by tenant management process space 610 for example. Invocations to such applications may be coded using PL/SOQL 634 that provides a programming language style interface extension to API 632. Invocations to applications may be detected by one or more system processes, which manages retrieving application metadata 631 for the subscriber making the invocation and executing the metadata as an application in a virtual machine.

Each application server 600 may be communicably coupled to database systems, e.g., having access to system data 625 and tenant data 623, via a different network connection. For example, one application server $600_1$ might be coupled via the network 614 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 612 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user may hit three different application servers 600, and three requests from different users may hit the same application server 600. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 600 to request and update system-level and tenant-level data from system 616 that may require sending one or more queries to tenant data storage 622 and/or system data storage 624. System 616 (e.g., an application server 600 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7 illustrates a diagrammatic representation of a machine 700 in the exemplary form of a computer system, in accordance with one embodiment, within which a set of instructions, for causing the machine/computer system 700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and a persistent database and/or a multi-tenant database implementation), which communicate with each other via a bus 730. Main memory 704 includes a search index 724 to store customer information and implement the mechanisms described herein, a file IO layer 723 (e.g., software bound to the individual search index files, including a term index type file making up the search index 724), and a query interface 725 to execute queries and operations as described herein. Main memory 704 and its sub-elements are operable in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable storage medium or a non-transitory computer readable storage medium or a non-transitory machine-accessible storage medium 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system to execute within a host organization, wherein the system comprises:
   a processor and a memory to execute instructions at the system;
   a search index stored on disk within the system comprised of a plurality of individual search index files, each of the individual search index files being accessible as a random access file, the search index having information stored therein, wherein at least one of the individual search index files constitutes a term dictionary or a term index type file having internal structure which allows a portion of the individual search index file to be updated, encrypted, and/or decrypted without affecting the internal structure of the individual search index file;
   wherein the search index stores both customer data and non-customer data organized into sub-blocks, wherein sub-blocks having customer data therein do not contain non-customer data and wherein sub-blocks having non-customer data therein do not contain customer data;
   a file input/output (TO) layer to encrypt the information being written into the individual search index file and to decrypt the information being read from the individual search index file, wherein the file IO layer encrypts and decrypts only a portion of the individual search index file in reply to an operation without requiring decryption or encryption of the individual search index file in its entirety; and
   a query interface to execute the operation against the information stored in the memory in its decrypted form.

2. The system of claim 1, further comprising:
   the memory to receive the information in its decrypted form from file IO layer during the process of receiving and processing the operation against the search index, the operation affecting at least the individual search index file amongst the plurality of individual search index files which make up the search index.

3. The system of claim 1, further comprising:
   the file IO layer to encrypt and decrypt the information given an encryption key and Initialization Vector (IV), wherein the search processing components interacting with the file IO layer will receive decrypted customer data from the individual search index file when given a correct encryption key and IV and continue processing the operation and creating search results without any further knowledge of what or how encryption occurs within the disk's file system.

4. The system of claim 1, wherein the file IO layer is a software implemented interface layer to encrypt and decrypt the information from at least the individual search index file of the search index at the IO level by interacting directly with and being bound uniquely to one or more of the plurality of individual search index files within the search index.

5. The system of claim 1:
   wherein the operation is an update operation including at least a write operation of new or updated information into the individual search index file of the search index;
   wherein the memory receives the information in its decrypted state via the file IO layer after receipt and during processing of the update operation as part of creating a return result responsive to the update operation;
   wherein the query interface executes the update operation against the information in the memory in its decrypted state including at least performing the write operation of the new or updated information in the memory; and
   wherein the file IO layer encrypts the information in the memory having at least the update or the addition thereto and writes the encrypted information back into the individual search index file of the search index.

6. The system of claim 1:
   wherein the operation includes a read-only search query operation of the information previously stored in the individual search index file of the search index;

wherein the memory receives the information in its decrypted state via the file IO layer after receipt and during processing of the read-only search query operation as part of creating a return result responsive to the read-only search query operation;

wherein the query interface executes the read-only search query operation against the information in the memory in its decrypted state; and wherein the file IO layer takes no further action on the information in the memory in its decrypted state subsequent to execution of the read-only search query operation.

7. The system of claim 6:

wherein the read-only search query operation comprises one of an exact term search or a wild card search, and wherein the exact term search or the wild card search is performed by the query interface against the information in its decrypted state in the memory.

8. The system of claim 1, wherein the search index is an Apache Lucene compatible type index to which random access is made to sub-portions of individual search index files within the search index and to which updates to the sub-portions of the individual search index files within the search index are made without affecting an internal structure of any individual search index file being accessed or updated within the search index.

9. The system of claim 1, wherein the at least one of the individual search index files comprises a plurality of terms delineated by internal structure of the search index, each term corresponding to at least a value for the term and a field within which the term is maintained.

10. The system of claim 9, wherein the individual search index file is divided into blocks and further wherein the blocks are divided into sub-blocks within which the customer data of the individual search index file and the non-customer data of the search index do not share any same sub-block.

11. The system of claim 10:

wherein the file TO layer encrypts all terms of the individual search index file as a single contiguous block including the customer data at rest as stored on disk within the individual search index file to reduce vulnerability of the customer data to frequency based attacks and/or reconstruction of the customer data from the search index.

12. The system of claim 9, wherein each term is marked with term information and a term suffix in accordance with an Apache Lucene compatible type index.

13. The system of claim 1, wherein the information comprises sensitive customer data having at least one of the following represented therein: customer name, customer telephone number, customer email address, customer mailing address, customer salary data, customer financial data, customer heath records data, customer order history, customer preference data, customer payment information, and/or customer calendar data.

14. The system of claim 1:

wherein the individual search index file and storage of the information within the search index is implemented via the plurality of individual search index files as stored on disk within the system which are selectively retrieved and/or updated during the process of adding index documents or executing operations including search queries, add operations, delete operations, and update operations; and wherein the query interface is operable to submit queries, including the operation, against the search index.

15. The system of claim 14:

wherein the database comprises a multi-tenant database system implemented by the host organization to store customer data and search index metadata on behalf of a plurality of separate and distinct customer organizations which utilize the multi-tenant database system; and wherein each of the plurality of separate and distinct customer organizations which utilize the multi-tenant database system constitutes an entity selected from the group consisting of: a separate and distinct remote organization, an organizational group within the host organization, a business partner of the host organization, or a customer organization that subscribes to cloud computing services provided by the host organization.

16. The system of claim 1:

wherein the customer data and the non-customer data do not share any same sub-block and divided into the sub-blocks accordingly; and wherein access to the non-customer data cannot be directly associated with any specifically encrypted term from the term dictionary or the term index type file due to all terms of the term dictionary or the term index type file being encrypted as a single contiguous block.

17. A computer-implemented method to execute within a host organization having at least a processor and a memory therein, wherein the computer-implemented method comprises:

storing a search index on disk within the host organization, the search index comprised of a plurality of individual search index files, each of the individual search index files being accessible as a random access file, the search index and having information stored therein, wherein at least one of the individual search index files constitutes a term dictionary or a term index type file having internal structure which allows a portion of the individual search index file to be updated, encrypted, and/or decrypted without affecting the internal structure of the individual search index file;

wherein the search index stores both customer data and non-customer data organized into sub-blocks, wherein sub-blocks having customer data therein do not contain non-customer data and wherein sub-blocks having non-customer data therein do not contain customer data;

encrypting the information being written into the search index via a file input/output (TO) layer and decrypting the customer information being read from the search index via the file IO layer, wherein the file IO layer encrypts and decrypts only a portion of the search index in reply to an operation without requiring decryption or encryption of the individual search index file in its entirety; and executing, via a query interface, the operation against the information stored in the memory in its decrypted form.

18. The computer-implemented method of claim 17, further comprising:

receiving the information in its decrypted state into the memory from the file IO layer in advance of executing the operation against the information in the memory.

19. The computer-implemented method of claim 17:

wherein the individual search index file comprises a plurality of terms delineated by internal structure of the individual search index file, each term corresponding to at least a value for the term and a field within which the term is maintained; and wherein the method further comprises:

dividing the individual search index file into blocks, and dividing the blocks into sub-blocks within which the customer data of the individual search index file and the non-customer data of the individual search index file do not share any same sub-block.

20. The computer-implemented method of claim 17:
wherein the host organization implements the method via computing architecture of the host organization including at least the processor and the memory;
wherein a user interface operates at a user client device remote from the host organization and communicatively interfaces with the host organization via a public Internet;
wherein the operation is received at the user interface of the user client device and communicated to the host organization via the public Internet; and
wherein the host organization operates as a cloud based service provider to the user client device.

21. The computer-implemented method of claim 17, wherein the host organization provides a multi-tenant database system which implements the search index executing via computing architecture of the host organization, the multi-tenant database system having elements of hardware and software that are shared by a plurality of separate and distinct customer organizations, each of the separate and distinct customer organizations being remotely located from the host organization.

22. Non-transitory computer readable storage media having instructions stored thereon that, when executed by a processor of a system, the instructions cause the system to perform operations comprising:
storing a search index on disk within the host organization, the search index comprised of a plurality of individual search index files, each of the individual search index files being accessible as a random access file, the search index having information stored therein, wherein at least one of the individual search index files constitutes a term dictionary or a term index type file having internal structure which allows a portion of the individual search index file to be updated, encrypted, and/or decrypted without affecting the internal structure of the individual search index file;
wherein the search index stores both customer data and non-customer data organized into sub-blocks, wherein sub-blocks having customer data therein do not contain non-customer data and wherein sub-blocks having non-customer data therein do not contain customer data;
encrypting the information being written into the search index via a file input/output (TO) layer and decrypting the customer information being read from the search index via the file IO layer, wherein the file IO layer encrypts and decrypts only a portion of the search index in reply to an operation without requiring decryption or encryption of the individual search index file in its entirety; and
executing, via a query interface, the operation against the information stored in the memory in its decrypted form.

23. The non-transitory computer readable storage media of claim 22, wherein the instructions cause the system to perform operations further comprising:
receiving the information in its decrypted state into the memory via the file IO layer after receipt and during processing of the operation as part of creating a return result responsive to the operation.

24. The non-transitory computer readable storage media of claim 22:
wherein the individual search index file comprises a plurality of terms delineated by internal structure of the individual search index file, each term corresponding to at least a value for the term and a field within which the term is maintained; and
wherein the instructions cause the system to perform operations further comprising:
dividing the individual search index file into blocks, and
dividing the blocks into sub-blocks within which the customer data of the individual search index file and the non-customer data of the individual search index file do not share any same sub-block.

* * * * *